July 22, 1969   M. C. DEIBERT   3,457,113
LAMINAR ELECTRODE INCLUDING HYDROPHOBIC AND
HYDROPHILIC LAYERS; METHOD OF MAKING; FUEL
CELL THEREWITH; AND METHOD OF USING
FUEL CELL
Filed March 1, 1965

*Inventor*
Max C. Deibert

United States Patent Office 3,457,113
Patented July 22, 1969

3,457,113
LAMINAR ELECTRODE INCLUDING HYDROPHOBIC AND HYDROPHILIC LAYERS; METHOD OF MAKING; FUEL CELL THEREWITH; AND METHOD OF USING FUEL CELL
Max C. Deibert, Needham Heights, Mass., assignor to Monsanto Research Corporation, St. Louis, Mo., a corporation of Delaware
Filed Mar. 1, 1965, Ser. No. 435,936
The portion of the term of the patent subsequent to May 28, 1985, has been disclaimed
Int. Cl. H01m 27/04, 27/10; B32b 7/02
U.S. Cl. 136—86               14 Claims

ABSTRACT OF THE DISCLOSURE

Novel laminar membrane electrodes especially useful in fuel cells and the method for making same. The electrodes essentially comprise two layers containing different electrode materials. One of the layers is hydrophilic and the other is hydrophobic. The layers are produced by mixing the electrode material, a polymeric binder and a liquid dispersing medium to form a viscoelastic dough. The doughs are spread to membrane thickness and heated to cure the polymeric binder.

---

This invention relates to a novel membrane electrode and method for making the same, and more particularly, provides a novel laminar diffusion membrane electrode and method for making it.

By a diffusion electrode is meant a porous electrode through which a feedstock can pass to reach the electrolyte of a cell. It is known that the electrochemical reaction in a cell takes place where there is simultaneous contact of the feedstock (fuel or oxidant), the electrode, and the electrolyte, and in a diffusion electrode, this is generally within the pores.

While an electrode may be made of a material catalytic for the electrochemical reaction, frequently it is made of a conductive but non-catalytic material, and catalyst is applied to its surface. For example, it may be made of nickel or carbon, electroplated with a catalyst such as palladium or platinum; this economizes on the use of the more expensive, catalytic component. The electrochemical reaction then takes place at the feedstock/catalyst/electrolyte triple contact points, the catalyst being the electrode component at which the electrochemical reaction takes place.

The electrolyte is advantageously liquid: solid ion-exchanging electrolyte materials usually produce high internal resistance losses, which reduce the cell power output. In a diffusion electrode with excessively large pores, electrolyte may flood the electrode pores to the extent that this interferes with feedstock's contacting the electrode or catalyst on the electrode. It may also be undesirable for liquid at the electrolyte to be able to pass through the electrode into the feedstock zone on the other side. To prevent gross liquid flow through a diffusion electrode, it may be water-proofed by applying a hydrophobic material to its surface. For example, a polymer such as polytetrafluoroethylene may be applied to a surface of a porous carbon diffusion electrode, to water-proof it.

In my concurrently filed application, I have disclosed a method of making diffusion membrane electrodes by mixing a particulate electrode material with a liquid dispersion medium and a polymeric binder to form a viscoelastic dough, spreading this to form a thin membrane, and curing the membrane by drying and heating to produce a strong flexible diffusion electrode made up of the electrode material and the polymeric binder. By an electrode material is meant a conductive material, a catalyst, or combinations of the same.

Suitable electrode materials are carbon and platinum, and a suitable polymeric binder is polytetrafluoroethylene. The latter is a hydrophobic polymer, and when combined with a hydrophobic carbon black, it gives a hydrophobic electrode by the stated process. When combined with platinum black, I have found it gives a moderately wettable and thus slightly permeable electrode, however.

Various methods can be used to confer desired properties on these membrane electrodes. For example, the hydrophobic ones made with carbon can be electroplated with a catalyst, to make them active as electrodes where carbon is not a catalyst for the desired electrochemical reaction; and the ones made with platinum black which are wettable can be sprayed or coated with a layer of a hydrophobic polymer like polytetrafluoroethylene to make them water-proof.

However, as will be appreciated, these procedures add extra steps to the process of making diffusion electrodes with suitable properties for use in a cell. Also, they are apt to plug up at least some of the pores in the underlying electrode.

It is an object of this invention to provide an improved diffusion electrode and method of making the same.

A particular object of this invention is to supply novel diffusion electrodes of laminar construction, and a novel method of making such electrodes.

These and other objects will become evident on consideration of the following specification and claims.

It has now been found that extremely active and long-lived diffusion electrodes can be prepared by producing membranes from viscoelastic doughs made by mixing a particulate electrode material with a liquid dispersion medium and a polymeric binder, and pressing two or more of such membranes together to form a laminar electrode, the said membranes being cured by drying and heating to form diffusion membrane electrodes.

In the description of the invention, reference is made to the accompanying drawings of which.

A number of advantages have been found to flow from the above-stated procedure whereby membranes are combined into a laminate. Normally, at least one of the two said membranes will be hydrophobic, made for example from hydrophobic carbon and polytetrafluoroethylene. The resulting laminar electrode then includes at least one hydrophobic surface. The cured membrane has the porosity desirable for a diffusion electrode, so there is not the problem of blocking pores which exists when a hydrphobic coating has to be applied to a porous diffusion electrode. Also, it is conductive, whereas the water-proofing layers are usually not. This layer does not, then, raise the internal resistance of cells employing this electrode, which a non-conductive hydrophobic layer may do. Current connection can be made over the entire surface of the membrane electrode to a backing current collector such as a screen, whereas if the hydrophobic side of an electrode is non-conductive, electrical current collection can be accomplished only at the outer edges of the electrode.

The second layer may advantageously be a membrane including an electrochemical catalyst such as platinum. The expense of this makes it desirable to use as little as possible. Electrode membranes can be prepared from a viscoelastic dough wherein the amount of such catalyst is minimized by diluting it with a particulate conductive material such as carbon. However, it is found that there is a limit to the dilution which can be made in this way without adversely affecting the catalytic activity of the metal. Thus, simply mixing an electrochemical catalyst with a second particulate conductive material as filler is effective to reduce the electrode content of an expensive catalyst like platinum only to a limited extent. With a laminar structure as presently provided, however, rare and expensive catalysts are conserved by limiting the expensive catalyst to a thin layer coincident with the electrolyte interface.

Also, as will be appreciated, reducing the thickness of an electrode with a catalyst dispersed in it increases the fragility of the electrode membrane and its susceptibility to mechanical rupture. If membranes in which the electrode material is substantially exclusively platinum or a like expensive metal catalyst are made thin to conserve catalyst, they are hard to handle and easily torn. It is desirable to associate a foraminous structure such as a screen with the membrane electrodes: it provides mechanical support, may reduce the internal resistance in a cell, and may be used as a current collector. Application of a very thin membrane to a screen without producing breaks in the membrane surface is difficult. The thicker and stronger membrane structure formed by laminating a thin membrane containing a catalyst to a second membrane containing a less expensive but conductive electrode material facilitates preparation of membrane electrodes having an unbroken surface which include a screen.

The stated laminar electrodes in which the electrode material in one membrane comprises a noble metal catalyst such as platinum and the electrode material in the second membrane comprises a hydrophobic carbon black have surprising advantageous properties. They are useful as cathodes in fuel cells employing hydrazine as a fuel and an oxidant like oxygen. When hydrazine is supplied as the fuel to a diffusion anode in a fuel cell, while ideally the hydrazine will be completely consumed at the anode, in practice some of it will usually penetrate the electrode without reacting. If it thus reaches the electrolyte, it can be transported through the electrolyte to reach the cell cathode. Platinum is a catalyst for hydrazine electrochemical reaction, and selectively so, to the extent that a platinum electrode in the simultaneous presence of hydrazine and oxygen will preferentially catalyze the oxidation of the hydrazine rather than the reduction of the oxygen. In consequence, if hydrazine penetrates the electrolyte in a cell to reach a platinum cathode supplied with oxygen as a feedstock, the cathode goes to the hydrazine oxidation potential, which means that both the electrodes of the cell are then at the same potential. Since a voltage output is obtained from an electrical cell by virtue of the fact that there is a difference in potential between the electrodes, the consequence of the cathode shifting to the hydrazine oxidation potential is that the cell will then not deliver any significant amount of power. Accordingly, cells operating on hydrazine as a fuel have previously had to avoid either use of a platinum cathode or else use of an oxidant such as oxygen or air, in which the effective oxidant is oxygen.

Surprisingly, the presently provided laminar platinum-on-carbon membrane electrodes have been found to be useful as cathodes in fuel cells employing such oxidants and using hydrazine as a fuel. The hydrazine does penetrate through the electrolyte to reach the cathode, but the cathode potential remains at an oxygen reduction potential rather than going to the hydrazine oxidation potential. Thus, presently provided electrodes have unexpected advantageous properties.

As will be appreciated, the present invention is not limited to the provision of the stated platinum-on-carbon membrane electrodes and methods of preparing the same, although these form a preferred embodiment of the invention. The combination of a hydrophobic membrane, such as one prepared from a hydrophobic conductive carbon black, and a membrane containing a metallic electrochemical catalyst has been found generally advantageous. Indeed, advantages may sometimes be obtained by supplying laminar membrane electrodes employing other combinations of membranes, such as ones in which the membranes are of the same composition.

Among the important desirable qualities of the presently provided electrodes are good mechanical properties (flexibility, toughness, durability, and so forth), complete impermeability to liquid phase transfer, and utility with acidic, basic or neutral electrolytes. They can be used with potassium carbonate electrolyte, which is advantageous because, unlike KOH, it is carbon-dioxide-rejecting. They are active at low temperature and pressure conditions, starting up at room temperature (70° F.) and with a gas feed pressure in the range of 0 to 5 pounds. They are generally not pressure-sensitive.

The electrodes made with suitable cathode electrochemical catalyst such as noble metals like platinum exhibit high activity on air, as well as on oxygen, at ambient temperature, and operate as an air electrode with low to zero back pressure. This means that the feed gas readily diffuses through the electrode to the electrolyte, without forcing, whereas other air electrodes require as much as 20 p.s.i.g. or more pressure to force gases through the electrode against the back pressure of the electrolyte. Thus the need for pressurizing equipment in cells using the present electrodes is minimized. Also, nitrogen present in air readily diffuses back through the electrodes, to be withdrawn in a purge of the feed gas, whereas other electrodes cannot work on air because of nitrogen build-up in the cell.

The presently provided membrane diffusion electrodes are useful for a wide variety of applications. They can be used as either the anode or the cathode of a cell, and may be used to advantage as the electrodes not only of fuel cells, but also in other electrochemical cells. Thus for example, they may be used as electrodes, and particularly as air electrodes, in primary cells as an air cathode, or in electrowinning apparatus, for purposes such as electrowinning oxygen from air, and so forth.

For the preparation of the presently provided laminar electrodes, viscoelastic doughs are prepared by mixing a particulate electrode material with a polymeric binder and a liquid dispersion medium. The process used to make the membranes is that of the above mentioned, concurrently-filed application. (Generally for carbon membranes, it is preferable to use an improvement on it, wherein the liquid dispersion medium comprises organic solvent, as described in a concurrently-filed application of Wung Dai Yee and Max C. Deibert, and as further discussed below. However, the principle is the same.)

The process of making the doughs essentially consists of mixing a particulate electrode material with a liquid dispersion medium and a polymeric binder, which latter is preferably in the form of a dispersion in a liquid dispersion medium, to form a viscoelastic dough. To make the laminates, this dough is spread to form membranes without substantially changing the liquid content of the viscoelastic dough. The membranes formed from the viscoelastic doughs are assembled by pressing them together. They may be pressed together prior to complete curing, as they are rolled out into membranes, or after being formed into separate membranes, either before or after partial desolvation, produced by air drying, for example. Pressures like those used in rolling out the membranes, such that liquid is not formed out of the membranes to any substantial degree, are suitable for pressing uncured membranes together into the laminar structure sufficiently to provide adherence. Usually a screen will be pressed into the surface of the assembly, and the procedure for this is like that for pressing the membranes together, such that liquid is not forced out of the membrane to any substantial degree. The laminar assembly, containing two or more layers of membranes of viscoelastic doughs, is then dried and cured by heating. For certain cases, it is useful to cure single membranes and then cold-press them together into a laminate, under high pressure; however, this alters the pore structure, making the electrode much less permeable to gases or the like, and the above-stated procedure in which the membranes are pressed together before curing is usually preferable for purposes such as preparation of air electrodes.

The unusual and valuable utility of the presently provided laminar electrodes is believed to be at least in part a result of the unusual nature and activity of the membranes employed for their preparation. Other factors probably enter into their advantageous qualities, such as the fact that their porosity is inherently produced in the process of making the electrodes, and the pores are not blocked by application of modifying agents to their surface after manufacture, the fact that they inherently include an interface, which may possibly provide an especially advantageous electrochemical reaction site, and other advantages such as those stated above, whereby they facilitate use of thin films of expensive catalysts, for example. However, the unusual qualities of the membranes used in making these laminar electrodes, such as their strength, flexibility, activity and so forth, significantly contribute to their utility.

Particulate forms of electrode materials usually have especially high surface areas per unit weight. If these can be incorporated into an electrode without greatly decreasing the exposed surface area, they provide especially active electrodes. A mere mixture of particulate materials generally has no mechanical strength, but a polymeric binder can be used to cohere the particulate materials into a solid, coherent electrode structure.

The particulate electrode material can be mixed with the polymeric binder in various ways. One approach consists of mixing dry particulate electrode material with dry particulate polymer, and fusing the mixture into a solid coherent structure. Heat and pressure may be used to produce such fusion. This method tends to involve high polymer loadings, and also has other deficiencies, as noted below. A second approach consists of precipitating the polymer onto electrode material particles, and fusing the particulate product by means as mentioned above. Both these procedures, which depend upon fusing an essentialy dry particulate mass, tend to produce electrodes of low and erratic activity. This is possibly because the electrode material surface is partially covered by the polymer or buried in it, or perhaps because of inactivation of the electrode material by the temperatures or pressures of the molding processes.

The particulate electrode material can also be mixed with a liquid suspension of the polymeric binder, to form a loose slurry or paste. This permits thorough dispersion of the small polymer particles among the electrode material particles, so that low polymer loadings can be used. Drying the paste or slurry by driving off the liquid leaves an open porous structure which is fragile, and must be handled carefully to avoid cracking it. At this stage, it is not suitable for use as a diffusion electrode. It is so open and porous that liquids can flow directly through it, so that it would operate effectively as an immersion electrode, rather than a diffusion electrode. Immersion electrodes permit uncontrolled access of their feedstock to the opposing electrode, which is generally undesirable. Application of pressure and heat can be used to compact this product into a more closely packed and stronger structure. However, this alters the initial porous structure, and accordingly, the electrode structure is developed during the pressing step. Thus, a balance must be maintained between application of sufficient pressure and heat to produce a strong ultimate structure, and avoidance of pressure and heat excessive enough to close up the pore structure to the extent that the resulting electrode is not porous enough for use as a diffustion electrode, and particularly, as an air electrode, for example. To increase porosity, the mix may include materials which can be subsequently removed, such as a combustible organic material or a soluble inorganic material, subsequent combustion or leaching of which leaves porous spaces in the structure, when the porosity has been too greatly decreased during the pressing step. However, this adds still a further step to the process of developing a satisfactory porous electrode structure.

A homogeneous viscoelastic dough formed in accordance with my invention has the electrode pore structure developed during mixing prior to curing the membrane of the dough, and the pores are freed of contained liquid as the membrane is cured by drying or heating. The membrane of the viscoelastic dough is itself strong and coherent, rather than being loose and fragile, and after being cured as stated, does not require pressing to confer strength and coherence on it.

It will be evident that the stated process differs from the above-discussed processes in which dry mixes of polymer particles and electrode material particles or polymer-coated electrode material particles are molded or fused togoether, in that the pore structure is developed during mixing of a liquid-containing combination of materials. In contrast to the above-mentioned process using a loose dispersion such as a slurry or a paste, in the present process, compression is not required to confer strength on the structure after the liquid has been removed. My process wherein a viscoelastic dough is produced provides a coherent structure prior to removal of the liquid, and the desired limited porosity in the ultimate electrode structure is essentially developed then. Of course, the pores have to be cleared of liquid, and some sintering, fusion, or other process whereby the binding strength of the polymer is enhanced may take place during the curing, but it is not necessary to change the electrode's pore structure by measures such as pressing to make it suitable for use as a diffusion electrode.

The product of the stated process is a membrane which not only is very strong and flexible, and has the limited porosity required for diffusion electrodes, but which furthermore exhibits a very high degree of activity of the electrode material used in its preparation. The electrode behaves as if the surface area of the particulate electrode material in it is almost entirely exposed, rather than being partially buried under the polymeric binder.

That there should be this high activity of the electrode material combined with strength and flexibility is surprising. The flexibility and strength are of the nature to be expected if the polymer were contacting all the electrode material particles, binding them together. However, the activity is of the kind to be expected if the active electrode material were entirely free of a coating of the polymer.

It is my theory that be my procedure, I produce a continuous network of interconnected polymer particles coated with electrode materials. The observable properties are those of the electrode materials, as though the polymeric binder is coated with these materials, rather than the polyeric binder coating the electrode materials.

The amount of liquid in the dough is large enough so that the doughy mixture is sufficiently malleable to allow thorough mixing, yet small enough so that in the mixing there is a mechanical tendency to force the polymer particles together to form a network. Probably the electrode materials initially coat the polymer particles, which tends to diminish direct adherence of the polymer particles to one another. Then contacts between polymer particles are generated through abrasion of some electrode material at the points of contact between the coated polymer particles where the shear forces of the mixing process are highest. The contacts established by my procedure may be direct polymer/polymer contacts or may have a single particle of electrode material between the polymer particles. That polymer particle/electrode material particle contacts are strong and stable is evidenced by the fact that abrasion fails to separate electrode material particles from the surface of the cured membranes, although the surface of the membranes is nearly completely covered with electrode material. Thus the strength of the membrane is believed to depend on either direct polymer/polymer particle contacts or polymer/electrode material/polymer particle contacts. If there were two different electrode material particles coating two polymer particles at the point of contact between the two polymer particles, the strength of the membrane would depend on the strength of electrode material particle contacts with each other, which is weak. Therefore two polymer particles must contact either the same electrode material particle or contact each other, to account for the observed strength of the membranes.

Figures 1, 2, 3, 4:
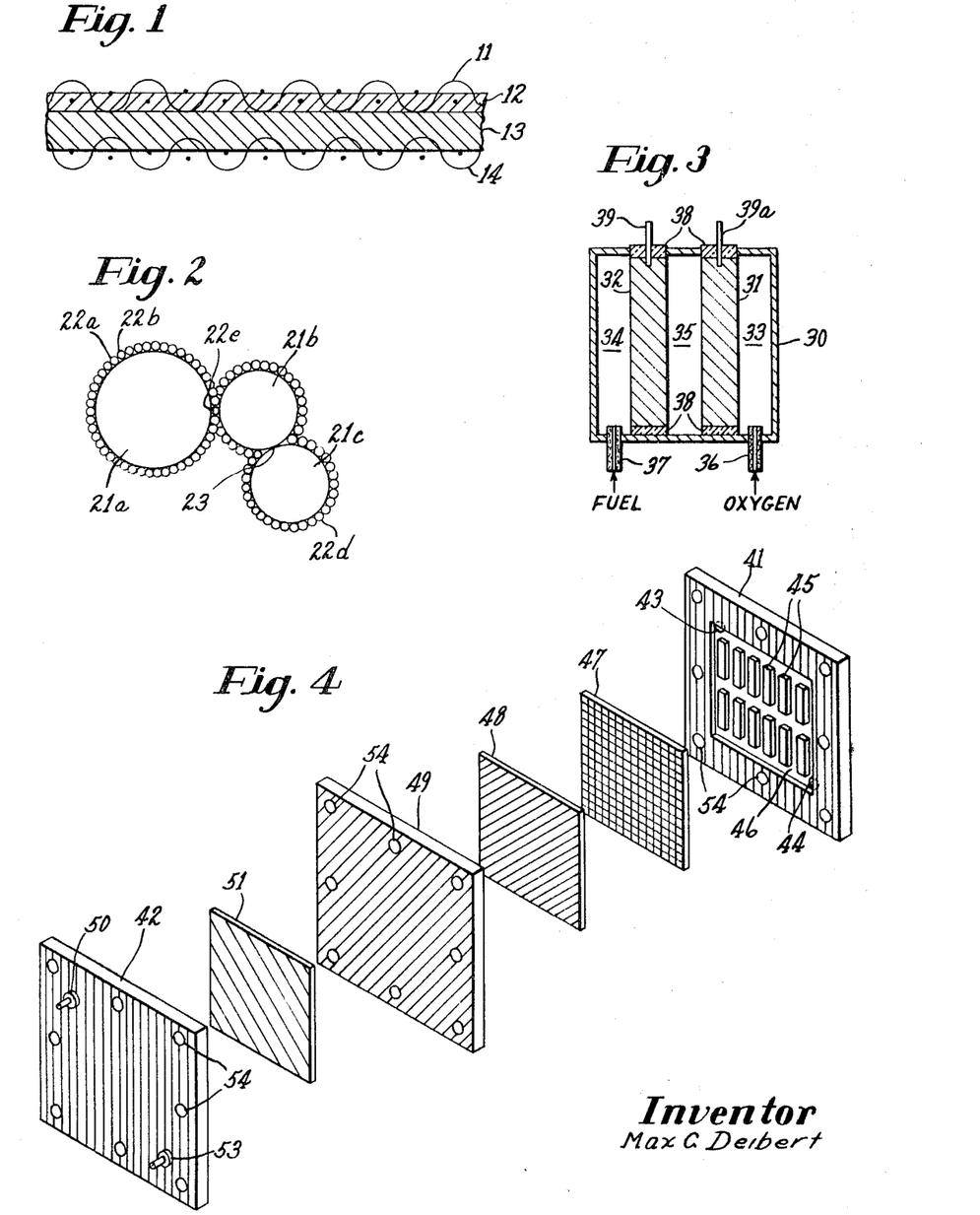
FIGURE 1 is a schematic illustration of a laminar membrane structure prepared in accordance with this invention.
FIGURE 2 is a schematic illustration of the postulated structure within diffusion electrode membranes of this invention.
FIGURE 3 is a cross-sectional diagrammatic illustration of a fuel cell employing diffusion electrodes.
FIGURE 4 is an exploded perspective view of the components of a fuel cell construction which may be employed in utilizing electrodes prepared in accordance with this invention.

For an illustration of the foregoing, reference may be made to FIGURE 2 which shows polymer particles 21a, 21b and 21c coated respectively with electrode material particles 22a, 22b, 22c and so forth. Electrode material particle 22e is in contact with both polymer particle 21a and polymer particle 21b, and serves to stick them together firmly. Polymer particle 21b and polymer particle 21c are in direct contact at contact point 23.

According to my theory, using a loose paste or slurry, rather than a dough, tends not to establish a continuous network of interconnected polymer particles, because the particles are kept separated by the liquid. Consequently such a paste, when dried, gives loosely structured membranes which are fragile and easily friable, and which must be compacted by compression to acquire toughness and strength, whereas my process avoids this necessity.

The unusual activity of my electrode membranes, which are as active as if the electrode material were essentially totally exposed and yet as strong as if they included a continuous polymeric binder network, is possibly due also in part to the fact that the electrodes do not need to be exposed to sintering or molding conditions during their manufacture. In any case, their activity as catalytic electrodes is such that their performance outranks other electrodes, prepared from components as employed herein but by different procedures, to a significant degree. Furthermore, the present process is one which can be conducted quite readily and simply. The membranes produced from the homogeneous viscoelastic dough formed by thorough mixing of the particulate electrode material, polymeric binder, and liquid dispersion medium, are strong and flexible, and require no particular care in handling.

Cure of the membranes is conducted by controlled drying and heating at or below ambient (atmospheric) pressure. It is characteristic of the present process that strong electrode structures which are impermeable to gross liquid flow, and which transmit liquids such as water at most through fine capillaries, if not only in the vapor phase, rather than as a freely flowing liquid stream, are formed during heating at atmospheric pressures or below.

As will appear in more detail hereinafter, a variety of materials may be employed in producing the membranes from which the present laminar electrodes are prepared. The type of polymeric binder and liquid dispersion medium particularly contemplated herein is a liquid dispersion of polytetrafluoroethylene, and the following description of the technique of fabricating electrode membranes according to this invention will particularly refer to such dispersions. Various electrode materials may also be used, illustrative of which are carbon and platinum blacks.

Factors which I have discovered to be of significance in the fabrication of the membranes are the ratio of polymer to electrode material, the particle size of these materials, the ratio of these solids to the liquid phase of the mixture in the dough, and the procedure by which its liquid content is removed from the dough to provide the cured membrane.

The ratio of the particulate electrode material to the polymer is adjusted to provide a continuous phase of polymer in the finished electrode membrane. By this I mean that, as discussed above, the contacts between polymer particles may be direct or may be accomplished by contact of two polymer particles with one and the same particle of electrode material, but in any case are such that an interconnected network of polymer particles is formed. Generally, the proportion of polymer to electrode material is desirably kept as low as possible, within this limitation, to maximize the exposure of the catalytic electrode material. At too high a ratio of polymer to electrode material, the activity of catalyst in the electrode is diminished and also, the electrode porosity decreases. However, with insufficient polymer, the membrane may lose solid particles when it is flexed or abraded after drying. I surmise that this may result because of failure to form an interconnected continuous network of polymer particles, as discussed above: extra electrode material particles are present which are not bonded to polymer. In general, the preferred weight ratio of polymer to particulate conductive material is in the range of from 5 to 1 to 1 to 20. Precise optimum ratios depend on the nature of the polymer and on factors such as the nature and particle size of the particulate electrode material. For polytetrafluoroethylene, which is the preferred polymeric binder for use in the present connection, the weight ratio of polymer to electrode material is generally in the range of 2 to 1 to 1 to 10, and usually in the range of from about 1 to 1 to 1 to 10.

The particle size of the electrode material should be low, suitably below about 1 micron. Particularly good results are obtained in the present method with electrode materials having an average particle size as low as about 0.05 micron and below. By this is meant the ultimate particle size: sometimes particulate materials are obtained initially in the form of aggregates, which break down into fine particles on exposure to shearing forces, such as those used in mixing in the present process. The dispersed polymer particles may for example have a size of about 0.2 micron. In general, the dispersed polymer particle size will be in the range of about 0.1 to 15 microns; a size in the range of 0.1 to 1.0 micron is generally preferred.

A portion of the electrode material may be larger: for example, it has been found that part of the conductive material may consist of carbon fibers, which have at least one dimension of the order of ½ to 1 inch. This is partially reduced during the mixing, but probably not to the extent of forming particles with each dimension below one micron. However, I prefer to have at least the majority of the conductive material having a small particle size, and of a frangible nature if it is of larger particle size than a micron, so that it does tend to coat the polymer particles.

The ratio of the solids (polymer plus electrode material) to the liquid phase of the mixture and the mixing will be such as to produce a viscoelastic dough, having a rubbery texture such that it can be stretched and elongated to a certain extent without breaking, but retaining its shape after deformation with sufficient force. The initial mixture may vary in consistency: my platinum/polytetrafluoroethylene dispersion mixes are initially pasty, while my carbon/polytetrafluoroethylene dispersion mixes are initially dry and powdery. However, on continued mixing, with the correct solids: liquid ratio, the mix will agglomerate and form a coherent lump of dough. The liquid content should be such that, after sufficient mixing, a dough is produced which is a viscoelastic material, mixing of which involves shearing forces, such that the particles are forced into contact with one another while being moved past each other.

Assuming sufficient mixing, the solids:liquid ratio determines the resulting structure. With a very high volume of liquid in proportion to solids, the mix is a paste. By a "paste" is meant a mixture of a consistency which will spread rapidly under gravitational forces, on surfaces like glass. Probably mixing a paste with a high liquid content fails to produce a dough because the excess liquid acts as a lubricant between the separate particles. By a "dough" I mean a mixture which is self-supporting and tends to hold together in a solid mass, rather than wetting and spreading rapidly on surfaces under it. Drying and heating a paste produces a fragile structure with high pore volume. A mixture with a lower liquid content holds together in a coherent mass that may be described as a dough, but which is not elastic or extensible, and which rather fragments when pulled. At a somewhat lower liquid content than this, the elastic and extensible viscoelastic type of dough which is contemplated in accordance with the present invention is formed.

If still less liquid is used to make the mix, the mix may agglomerate and form a rubbery dough which can be spread to a membrane. However, as a result of the low liquid content, after drying, this membrane has little or no porosity. The liquid content is therefore to be maximized as far as possible, while still producing a rubbery, elastic dough. Specific figures are dependent, as a rule, on the particular system in question. For example, in preparing a membrane with a platinum black, the weight ratio of the solids to the liquid content of the mix I use is approximately 1:1, whereas in preparing one with a carbon black, the preferred solids:liquid ratio is about 1:2. The volume ratio of solids to liquids generally runs about 1:1, however, in both these instances. In general, in any case, the amount of liquid to be employed may be described as the maximum which can be included while producing a dough of a viscoelastic consistency, and this can be determined experimentally.

The polymeric binder is preferably initially in dispersion. The polymer dispersion and any additional liquid needed to adjust the liquid content to the useful liquids content in the ultimate mixture may be mixed with the particulate electrode material either separately or as a preformed diluted dispersion.

The mix should be made as homogeneous as possible. The mixing is to be continued not only until the mix has cohered into a viscoelastic dough, but subsequently, until this dough has become quite stiff. A correctly proportioned mix not mixed well enough will lack mechanical strength after curing, or indeed, may crack in curing. The mixing process is conducted under conditions in which shearing forces are applied. For large batches, suitable mixing equipment is exemplified by a Banbury mixer or a differential roller mill, as employed in rubber processing. In smaller batches, the mixing may be produced by procedures including stirring, grinding in a mortar with a pestle, rolling and folding, and the like, or combinations of such procedures. The rolling and folding technique consists of rolling out the dough into a membrane (a structure with a thickness which is small compared to its length and width), folding this back into a lump, and rolling this out again into a membrane, repeatedly.

During mixing, loss of fluid content can occur as a result of forcing out the liquid from the mass by application of excessive pressure in the mixing operation, or by evaporation. It is important that the mixture should lose as little as possible of its fluid content (or else be so proportioned that the liquid losses are designed to produce a dough of the ultimately desired solids/liquid proportions). Excessive loss of liquid adversely raises the viscosity of the material and decreases the pore volume of the final membrane. Thus, the time and severity of the mixing should be minimized, consistent with obtaining homogeneity in the product.

After complete mixing, the dough is shaped into a thin membrane. The present viscoelastic dough cannot simply be compressed under high pressure to flatten it: if this is done, excessive amounts of liquid are driven out from the dough, and driven out unevenly, leaving thin areas and breaks in the flattened product. However, I have found that I can spread a rubbery dough into a flattened thin membrane without substantial loss of liquid, by applying gentle pressure with means exerting both vertical and lateral spreading forces, such as by rolling out the dough. This gives a membrane of even thickness, which is free of breaks and which contains essentially all of the liquid content of the dough. The membrane is flexible and tough, and can be handled freely: it is self-supporting, for example.

To avoid having the membranes stick and tear as they are formed from the dough, it is usually desirable to protect the dough from direct contact with the compressing and spreading pressure-imposing surfaces, by interposition of a layer of a non-wetting surface. For example, the dough may be enclosed between sheets or films of a polymer such as polyethylene, polypropylene, polytetrafluoroethylene or the like while it is being spread by rolling.

In essence, preparation of a laminar structure consists of following the above-described process steps to prepare two or more membranes comprising particulate electrode material, dispersed polymeric binder, and a liquid dispersion medium, in the form of viscoelastic doughs. The membranes can be rolled out together or one rolled out on the other, or rolled out separately and then assembled into a laminate by pressing them together, without using force such as to cause substantial loss of liquid from the membranes, using means such as a roller, for example. The electrode materials and the polymers in the individual membranes of the laminar assembly may be the same or different. When one electrode material is a wettable particulate material such as a platinum black, it may be advantageous to use a liquid dispersion medium for the polymeric binder which is aqueous or substantially aqueous, while the liquid dispersion medium may advantageously be a substantially organic liquid dispersion medium when the particulate electrode material is largely or entirely carbon, as will appear further hereinafter.

The thickness of the membrane laminate will be approximately that of the finished electrode membrane. The electrode will usually be below about 30 mils thick, and may be thinner, down to 3 to 5 mils or less. Usual means for controlling thickness of sheets formed by compression and spreading may be used, such as stops at the height of the desired thickness preventing further downward motion of the compressing and spreading agent.

Membranes prepared and cured individually and later cold-pressed into a laminate are crushed by the pressing and substantially thinner than the initial cured membrane.

In making electrodes by the stated novel process, the membrane or membrane laminate is usually pressed into a foraminous structure such as a screen prior to being cured. This provides mechanical support for the membranes; it may also decrease the internal resistance of a cell incorporating the electrode, and may serve as a current collector for the electrode. It is usually a screen or mesh of conductive material, generally metal wires or expanded metal, which conducts electricity with less internal resistance than the electrode membrane with which it is placed in contact, and may be referred to as a screen support or screen current collector. The spaces between the meshes permit free passage of the fuel cell components such as feedstock, electrolyte, and so forth, so that they do not interfere with the functioning of the fuel cell. A mesh size of from 20 x 20 to 100 x 100 (openings/inch) made with 2-10 mil wire is usually satisfactory. The screen is advantageously applied to the membranes by laying the screen on the membrane and applying pressure, with a roller or the like, to force the membrane (which is still a flexible soft dough) into the meshes of the screen. Screens can be applied to one or both sides of the laminate, or indeed, between the membranes if desired.

Reference may be made at this point to FIGURE 1, which illustrates a laminar electrode made in accordance with this invention, wherein 11 is a screen pressed into the surface of a laminate of membranes, 12 is a first membrane layer, such as a layer comprising platinum black and polytetrafluoroethylene, 13 is a second membrane layer such as a layer comprising a hydrophobic carbon black and polytetrafluoroethylene, and 14 is another screen. The figure represents a laminar electrode of this invention as it appears either before or after curing, and as produced either by assembling rolled-out membranes prior to curing by heating to stabilize the structure, or indeed by cold-pressing cured membranes.

The membrane laminate now, as such or in assembly with a screen, is ready to cure. The curing procedure involves drying and heating. By heating to cure the membrane laminate is meant application of elevated temperatures, above room temperature, to the membrane, to complete its drying and to produce mechanical strength by softening the polymer enough to stabilize the electrode structure. Part of the drying process may precede heating.

To avoid cracking, flaking and separation during the curing process, it has sometimes been found desirable to remove the majority of the liquid by drying through evaporation, without heating. The drying can be conducted by exposing the membrane to the air at a room (70° F.) temperature and in an atmosphere having a relative humidity somewhere below 100%, such as in the range of 30 to 75%. With the compositions of the present membranes, in which polytetrafluoroethylene dispersions are particularly contemplated, the membrane may develop cracks with too little drying before it is heated. The amount of care necessary in the drying depends somewhat on the dispersed particulate material in the electrode membranes and on the composition of the liquid dispersion medium, as well as the nature of the polymer. The membrane laminates containing dispersed carbon black of fine particle size and an aqueous dispersion medium are particularly prone to crack if the heating is too rapid; with dispersed metallic catalysts, this is not such a problem. Room temperature drying may be omitted altogether in some cases, particularly where subsequent heating is gradual and slow; when it is used, typical room temperature drying times range from 1 to 12 hours.

The electrode is in any case heated to dry it completely by removing liquid components of the mix, and to stabilize the membrane laminate structure. The heating preferably follows a gradual schedule, in which the temperature is raised by stages from room temperature to the ultimate heating temperature. This ultimate temperature will be high enough to remove substantially all the liquid content from the membrane laminate, leaving a product consisting essentially of a laminate of porous membranes of electrode material and polymeric binder. For electrodes prepared from polytetrafluoroethylene, this ultimate temperature may be 300–325° C., for example. To cure the electrode membrane throughly, and make a durable product which does not tend to separate from the screen or flake off under subsequent mechanical stress, such as encountered in use in a cell, it is necessary to heat the laminate to this extent, it has been found. It will be noted that the stated temperature is below the sintering temperature of polytetrafluoroethylene, which is about 327° C. The membranes may be heated to a sintering temperature or above, but in fact the activity of an electrode which has been heated to substantially above the sintering temperature of polytetrafluoroethylene has been found inferior to that of one heated only to 300° C.

As will be appreciated, if another polymer is used as the binder instead, the temperature will be approximately adjusted to avoid melting or decomposing the polymer. In general, the dough will be heated to a temperature bolow the melting point of the polymeric component, but enough to cause it to soften. Heating above the temperature needed to drive off components of the membrane other than the polymer and electrode material appears to be desirable, to form a strong membrane. The higher temperatures can be regarded as having the effect of stabilizing the contact points of the polymer with the electrode material. However, having the polymer flow so that it may cover the electrode material is undesirable: is should just be softened.

Application of moderate vacuum during the curing cycle is usually desirable. Besides helping to evaporate the liquid from the electrode membrane, it assists in removing any dispersing agent present. The intial polymeric binder dispersion may be the source of this dispersion agent. Heating will usually remove it, but an active catalytic electrode material like platinum black may cause such rapid decomposition of organic dispersion agents at elevated temperatures as to produce disintegration of the membrane. Application of vacuum in one of the initial heating stages of the curing cycle helps prevent this. Moderate vacuum such as pressures down to about 50–0.1 mm. Hg is usually sufficient.

While the foregoing description is directed to cure of a membrane laminate, the same description applies to cure of individual membranes, which may subsequently be laminated together by cold-pressing.

When the cure is complete, the residual membrane structures consist essentially of the polymeric binder and the dispersed electrode material; the liquid component of the original dough should have been substantially completely removed, along with any dispersing agent.

A variety of materials may be used in producing membrane electrodes according to the above-described procedure. The particulate electrode material in each layer will include an electrically conductive material and may include an electrochemical catalyst. These may be one and the same, or two different materials. If the catalyst is non-conductive, there should be enough conductive material present to make the finished membrane electrodes conductive. The stated laminar electrodes are especially advantageously made by assembling a hydrophobic carbon membrane containing a metallic catalyst such as platinum black.

The conductive carbon contemplated as one of the particulate conductive electrode materials in accordance with this invention, may, for example, be an acetylene black, which has a small particle size and is conductive. Some other carbon blacks, such as certain furnace blacks, are also conductive and may be used. The carbon used may be either hydrophobic or hydrophilic, porous or non-porous.

Contemplated electrode materials which are metallic may be anode or cathode catalysts, or may be included solely for electrical conductivity. For catalysis of the cathode reaction, it is possible to use noble metals such as gold, silver, platinum, palladium, rhodium and the like (Group VIII in the Periodic Table, Periods 5 and 6) or metal oxides such as combinations of nickel oxide and lithium oxide. The anodic reaction in a fuel cell may be catalyzed by a metal of Groups I–B, V–B, VI–B and VIII of the Periodic Table such as chromium, tungsten, molybdenum, cobalt, nickel, gold, silver, copper, platinum, palladium, rhodium, iridium, other metals such as manganese and inorganic compounds containing one or more of such metals such as nickel oxide, manganese oxide, cobalt molybdate, vanadium pentoxide, and the like. Still other metallic electrode materials and catalysts than those mentioned may be used. Platinum is especially active as an anode catalyst, and is particularly preferred as the particulate conductive electrode material for many applications. As noted above, a fine particle size is desirable and a finely divided form of platinum known as platinum black is an especially preferred metallic electrode material in the present connection.

As mentioned above, polytetrafluoroethylene is a particularly preferred polymer for use in practicing the method of the present invention. If desired, other polymers may be used instead.

Usually, to avoid electrode pore flooding, it is desirable to use a hydrophobic polymer, but hydrophilic polymers are sometimes useful: electrolyte can be introduced through the diffusion electrode with a feedstock, for example. Actually, the hydrophobic or hydrophilic character of the presently provided electrodes is controlled, it has been found, chiefly by the nature of the electrode material in it. Even when the polymer is hydrophobic, like polytetrafluoroethylene, an electrode material like Pt produces a hydrophilic membrane, while an electrode material like a hydrophobic carbon black produces a membrane which is hydrophobic.

Broadly, presently suitable hydrophobic polymers include any polymers having a low surface energy (which is characteristic of hydrophobicity) that will remain stable under fuel cell operating conditions (which may include heat, such as operating temperatures of 90° C. or higher, and contact with corrosive chemicals, such as acids, alkalies and oxidants). Such polymers include polymers of various halogen-substituted hydrocarbon monomers, particularly fluorine-substituted olefinic monomers. Halogen polymers that may be employed include polymers of fluorocarbons and substituted fluorocarbons wherein one or more fluorine atoms are replaced by hydrogen, chlorine, or bromine, such as polytetrafluoroethylene polytrifluoroethylene, polyvinyl fluoride, polyvinylidene fluoride, polytrifluoro-chloroethylene, and copolymers of different fluorocarbon monomers such as copolymers of tetrafluoroethylene and hexafluoropropylene. Fluorocarbon polymers have been reported to be far superior to other polymers for improving electrode performance, particularly as to wet-proofing electrodes.

Other hydrophobic and various hydrophilic polymers may, however, be used. Hydrocarbon polymers having a molecular weight in the range of 50,000 to 1,000,000 or more, having a free surface energy close to or below that of polyethylene, are suitable for hydrophobic electrode membrane formation. Among these are polymers and copolymers of ethylene, propylene, 3-ethyl-1-butene, 4-methyl-1-pentene, and 4,4-dimethyl-1-pentene. Silicone polymers are also suitable as hydrophobic polymers. Examples of other contemplated polymeric binder materials include polyvinyl butyral, polystyrene-butadiene, polyamides of hexamethylene diamine and adipic acid (nylon), polymethyl methacrylate, polyvinyl ethers such as the methyl ether, polyvinyl acetate and its partially hydrolyzed derivatives, cellulose derivatives such as methyl cellulose ethers, polyvinyl alcohol and so forth.

The polymeric binder is preferably initially in a dispersion, which may or may not contain the total ultimate liquid dispersion medium content of the mix prepared to form the viscoelastic dough of this invention. The term dispersion is used herein to refer to combinations of a polymer and a liquid dispersion medium which may be designated as emulsions, dispersions or suspensions; in any case, the polymer is combined with a liquid dispersion medium so as to remain distributed in it, at least briefly, after stirring, rather than settling out immediately.

Water is a liquid dispersing medium which is a suitable and satisfactory liquid dispersion medium or component of the liquid dispersion medium in the preparation of the present membrane electrodes. Aqueous dispersions of polytetrafluoroethylene, for example, are readily available: see, thus, U.S. 2,478,229; British 642,045; U.S. 2,534,058; U.S. 2,662,065, and other patents. Generally, methods are known for producing dispersions of other polymers in aqueous dispersion, also: for example, as taught in U.S. 2,559,752 for the production of chlorotrifluoroethylene polymer dispersions, these involve polymerizing the monomer in an aqueous medium.

The liquid dispersing medium may usually suitably consist essentially of water when the electrode material combined with it and the polymeric binder is metallic. When the electrode material in a membrane includes a substantial amount, such as above 20% by volume, of a conductive carbon black, and the membrane or a laminate of membranes prepared in accordance with this invention is pressed into a screen, cracks may appear during the curing process. Similar difficulties with cracking may sometimes be encountered with other particulate electrode materials such as metals, metal oxides, and the like.

If the carbon-containing dough is not sufficiently homogeneous, the membrane may show "mud cracking" on drying. It is permeated with a series of deep fissures, extending through from the top of the membrane back to the screen, and its appearance is like that of a dried-up mud flat. Polytetrafluoroethylene dispersions applied to a surface as a film more than a couple of mils thick are known to exhibit mud cracking, on drying, and the membranes prepared as described are usually thicker than this. Possibly the cause of such mud cracking is similar in the two cases.

If more time and effort is expended on achieving thorough homogeneity of the dough by mixing until the viscoelastic dough becomes quite stiff, then when the dough is spread into a membrane and the membrane is pressed into a screen, while "mud cracking" may no longer appear, there still are cracking problems. In this case, the cracking which appears may be described as a stress crack.

If a viscoelastic dough made by mixing carbon with a polytetrafluoroethylene aqueous dispersion is rolled out into a membrane and cured without being pressed into a screen, it rarely will crack. However, it shrinks in curing by drying and heating. The shrinkage is fairly substantial: the length and width each decrease by a factor of about 1 part in 6. When the carbon membranes are pressed into a screen before they are dried, the assembly tends to curl up. Presumably this is because the membrane is shrinking and therefore exerting a pull on the screen. If the screen and membrane assembly is flattened, the membrane is stretched and consequently cracks. With very thorough homogenization of a carbon/polytetrafluoroethylene aqueous dough, and slow drying, it is possible to produce electrodes mounted on a metal wire screen which are entirely crack-free and flat. However, this prolongs the processing time, and reliable, reproducible electrode production requires careful control of the process.

It has been found, however, that mixing a particulate electrode material with a polymeric binder and a substantially organic liquid dispersion medium to form a viscoelastic dough produces crack-free membranes readily and reproducibly with electrode materials which, when the liquid dispersion medium is substantially or entirely aqueous, tend to crack on drying when prepared by the same procedure. In particular, the use of a substantially oraganic liquid dispersion medium has been found valuable in the manufacture of hydrophobic diffusion electrodes from carbon black and polytetrafluoroethylene, in preventing the appearance of mud cracking or stress cracking in electrodes prepared from the membranes mounted on a screen. The membranes prepared from the substantially organic liquid dispersion medium do shrink on drying, as measured on membranes cured without being mounted on a screen, but only one-half to one-third as much as the membranes prepared from an aqueous polymer dispersion. Probably, therefore, the membranes mounted on screen supports are not under the same tension on drying, and this may explain their resistance to stress cracking.

In practicing this invention employing a substantially organic liquid dispersion medium, if the initial polymeric dispersion is in an aqueous medium, it will preferably contain a fairly high concentration of polymer, such as 10, 25% or more of the polymer by weight of the total, to permit addition of sufficient organic liquid for practice of this invention without unduly diluting the polymer dispersion. If the polymer dispersion initially contains a high content of organic liquid as the dispersion medium, this is so much the better; but the presence of water in the dispersion is not impermissible and indeed, may be advantageous.

When there is water in the initial polymeric dispersion with which the organic liquid dispersion medium is combined, in order to produce a non-cracking mixture, enough organic liquid medium will be used to provide at least about 20% by weight of the total liquids content of the mix. Generally, enough of the organic liquid will be introduced so that the combination of this with the liquid in the initial polymer dispersion will produce a preponderantly organic liquid dispersion medium. By this is meant that the liquids content is at least about 50% organic liquid, by weight. The exact preferred ratio of organic liquid to water will vary, depending on the nature of the polymer, the electrode material, the concentration of the polymer, and the like. For preparation of crack-free electrodes from an acetylene carbon black and aqueous polytetrafluoroethylene dispersion, a preponderantly organic liquid dispersion medium, containing between 60 and 80% organic liquid, remainder water, is the preferred liquid dispersion medium.

A wide variety of organic liquids may be used to provide the organic liquid component of the organic liquid-containing dispersion medium with which the polymeric binder is combined. Specifically, for a polymer like polytetrafluoroethylene, available in an aqueous dispersion, a water-miscible organic solvent such as an alcohol is particularly suitable, for example. Various alcohols, both aliphatic and aromatic, and both lower- and higher-boiling than water, have been found suitable for the stated purpose. Exemplary of presently useful aliphatic alcohols are isopropanol, 2-butanol, 2-methyl-2-butanol, isobutanol, n-butanol, 2-pentanol, 3-pentanol, 3,3-dimethyl-2-butanol, 3-methyl-3-pentanol, 2-methyl-2-pentanol, 2-methyl-1-butanol, 3-methyl-1-butanol, 3-hexanol, 2-hexanol, 1-hexanol, 3-ethyl-3-pentanol, 2-methyl-1-pentanol, 3-methyl-1-pentanol, 4-heptanol, 2-heptanol, 1-heptanol, 2,4-dimethyl-1-pentanol, 2-methyl-1-hexanol, 2-ethyl-1-pentanol, 2,6-dimethyl-4-heptanol, 1-heptanol, 2-octanol, 2-ethyl-1-hexanol, 1-octanol, tert-butyl alcohol, and so forth. The presently useful aliphatic alcohols also include cycloaliphatic alcohols such as cyclopentanol, 2-methyl-cyclohexanol, 3-methyl-cyclohexanol, 2,4-dimethyl cyclohexanol, 3,3-dimethylcyclohexanol, cyclohexanol, and the like. The aromatic alcohols useful in the practice of this invention are exemplified particularly by aralkyl alcohols such as benzyl alcohol, 3-methylbenzyl alcohol, p,α-dimethylbenzyl alcohol, 1-phenyl-n-propyl alcohol, 2-phenethyl alcohol, 3-phenylpropanol, phenyl n-hexyl carbinol and the like. In general, the stated alcohols are hydrocarbons free of aliphatic unsaturation, having hydroxy substituents on aliphatic carbon atoms, and containing up to 16 carbon atoms, but the useful organic liquids are not limited to those of the stated nature. Aqueous dispersions of polymers including polytetrafluoroethylene can also be diluted with glycols and with amino alcohols (U.S. 2,937,136), exemplary of which are 1,2-ethanediol, 1,2-propanediol, 1,3-propanediol, mixtures of glycerol and ethylene glycol, diethylene glycol, glycerol, ethanol amine, glycerol alpha-monomethyl ether, diethanol amine, triethanol amine, glycerol alpha-monochlorohydrin, monacetin, diethylene glycol monobutyl ether, diethylene glycol monoethyl ether, and the like. Still other substances with which dispersions of polymers including polyeterafluoroethylene may be combined include the normally liquid paraffin hydrocarbons such as pentane, hexane, heptane, or octane, aromatic hydrocarbons such as benzene, toluene, xylene, cycloaliphatic hydrocarbons such as cyclohexane, low-, medium- and high-boiling mineral oil fractions which may include mixtures of paraffins, naphthenes and aromatics, and so forth. Indeed, the diluting organic liquid may comprise halogenated hydrocarbons such as carbon tetrachloride or trichloroethylene, a polydimethylsiloxane (viscosity 100 centistokes), a perfluorocarbon oil, b. 150–170° C./10 mm. Hg, and still other types of organic liquids.

Mixtures of organic liquids such as those above listed may also be employed.

Certain compounds such as ethylene glycol, ethylene glycol monethyl ether, diethylene glycol diacetate, diethylene glycol, diethyl ether, ethyl lactate and acetone are reported to coagulate polytetrafluoroethylene dispersions to some extent, and thus may be less suitable than the above-mentioned compounds as diluents for such dispersions. However, coagulation and precipitation of polytetrafluoroethylene from its concentrated aqueous dispersions is observed to occur even on addition of organic liquids such as isopropanol or an isopropanol/benzene mixture, which are useful in accordance with this invention, so that coagulation or precipitation of the polymer by the organic liquids employed as diluents is not necessarily an indication of non-utility.

In some cases, the polymer liquid dispersion medium, either present in the initial polymer dispersion or as prepared in mixing, whether it is entirely aqueous or contains an organic solvent, may contain or advantageously have added thereto a dispersing agent. The types of dispersing agents employed in making concentrated aqueous dispersions of polytetrafluoroethylene have been reported to be, for example, an alkali metal or ammonium salt of an acid of formula $H(CF_2CF_2)_{3-10}COOH$, a saturated $C_{12}$ or higher aliphatic, generally aliphatic, a fluorine-containing compound such as 1,2-dichlorotetrafluoroethylene, and so forth. The dispersions including organic solvents sometimes advantageously include surfactants such as lauryl sulfate, an ether of a phenol with a polyethylene glycol, and the like (see U.S. 2,613,193), alkyl aryl sodium sulfonates, sorbitan, salts of the higher fatty acids and their polyoxyethylene derivatives, and so forth.

For the present purposes, I usually use a concentrated aqueous emulsion, having a composition of about 50:50 by weight water and polytetrafluoroethylene, to which has been added a small amount of some organic liquid such as toluene, and surfactants such as lauryl sulfate, an ether of a phenol with a polyethylene glycol, and the like (see U.S. Patent 2,613,193). I either dilute this to the requisite concentration or add the necessary additional diluting liquid separately in mixing this with the particulate electrode material. However, a suitably less concentrated aqueous dispersion may of course be used.

For use, the cured membrane electrode is mounted in a cell such as a fuel cell. As those skilled in the art know, a fuel cell is a device for the generation of electrical energy in which a combustible fuel and an oxidant are supplied to a cell system including two electrodes separated by an electrolyte during operation of the cell. An individual fuel cell is ordinarily made up of a cell container, two conducting electrodes each including a catalyst for the desired electrochemical reaction, means for introducing an oxidant to the cathode and means for introducing a fuel to the anode, an electrolyte, and connecting means associated with each electrode (cathode and anode) for establishing electrical contact with an external circuit. Diffusion electrodes, as provided by this invention, may be positioned in the cell between the electrolyte and the means for introducing the oxidant and the fuel respectively to the two electrodes. Usually a battery of fuel cells, connected in a series or parallel, is required for supplying the power needed to operate electrically-actuated equipment.

The nature of the fuel, oxidant and electrolyte may vary. Suitable fuel and oxidant feedstocks may include materials which are either liquid or gaseous at the operating temperatures for the cell. Examples of useful fuel feedstocks are hydrogen, gases comprising hydrogen such as those produced by reforming hydrogen sources such as hydrocarbons, dimethyl hydrazine or the like, hydrazine, hydrocarbons, such as propane or methane, oxygenated hydrocarbons such as alcohols like methyl alcohol, ketones like acetone, aldehydes like formaldehyde, carboxylic acids like formic acid, and so forth. Examples of suitable oxidants include oxygen, gases comprising oxygen such as air, dinitrogen tetroxide, nitric acid, and so forth.

Suitable electrolytes include acidic electrolytes such as aqueous solutions of $H_2SO_4$, $H_3PO_4$, HCl, $HNO_3$, perchloric acid and other strong acids, aqueous solutions of strong bases such as KOH, NaOH, LiOH and so forth, aqueous carbonate electrolytes such as $K_2CO_3$—$KHCO_3$, $Na_2CO_3$—$NaHCO_3$, molten salts and so forth.

It will be appreciated that the presently provided novel electrode structure need not provide both the electrodes of a cell. If desired, one electrode may be of a structure known in the art, such as a porous diffusion electrode, as exemplified for example by a porous plaque prepared by sintering nickel powder particles and activated by deposition of an electrochemical catalyst such as platinum or palladium on the surface. The electrode may also be a solid sheet of platinum, operating as an immersion electrode, in a cell employing a feedstock which can be mixed with the electrolyte and selectively catalyzed for the electrochemical reaction. Accordingly, it is possible for one of the feedstocks of cells in accordance with this invention, if desired, to be a feedstock other than those mentioned: for example, it may be a metal consumable anode. However, inasmuch as this invention provides electrodes suitable for use both as cathodes and as anodes, advantageous results are often obtained by making both the electrodes in accordance with this invention.

As illustrative of fuel cell construction, reference may be made to the figures.

FIGURE 3 is a diagrammatic vertical section of a fuel cell wherein the conducting electrodes are plate-like structures which may be either flat, angular or curved in accordance with the desired embodiments of the basic design.

In FIGURE 3 illustrating a cell employing plate-like electrodes, the space inside cell container 30 is divided by a porous cathode (oxidant electrode) 31 and a porous anode (fuel electrode) 32 into an oxidant receiving zone 33, a fuel receiving zone 34 and electrolyte compartment 35. Oxidant is introduced into oxidant receiving zone 33 via conduit 36. Fuel is introduced into fuel receiving zone 34 via conduit 37. Electrodes 31 and 32 are insulated from cell container 30 by conventional insulators 38. Connecting means 39 and 39a form the beginnings of an external circuit for withdrawing electrical power from the cell.

FIGURE 4 represents a somewhat similar type of cell, in an exploded perspective view. In FIGURE 4, the cell end plate 41 contains an inlet port 43 and an outlet port 44 and supporting manifold brackets 45 in recess 46 for flow of a feedstock (such as oxygen) through recess 46. In the assembled cell, the feedstock will pass through screen current collector 47, which will be positioned against separating brackets 45, and through diffusion electrode (anode) 48 to reach an electrolyte contained in electrolyte holder 49, which may be, for example, an asbestos mat saturated with aqueous KOH as the contained electrolyte. Excess feedstock and vent gases from the electrolyte may exit by diffusion back through anode 48 and current collector 47 into recess 46 and exit through outlet port 44. A similar arrangement exists for inlet of a feedstock such as a fuel like hydrogen, for example, through inlet port 50 in end plate 42, to diffuse through cathode 51 reaching contained electrolyte 49; any rejected vapors exit back through end plate 42 through outlet port 53. Bolt holes 54 are used for introduction of bolts (not shown) to hold the assembly together.

The electrodes of this invention may be embodied in a primary cell, for example, by placing a block of an anodic metal such as zinc and an electrode suitable for use as a cathode such as a carbon membrane electrode into contact with an electrolyte such as aqueous caustic, arranged so that the face of the cathode away from the electrolyte is exposed to air. Connection of the zinc anode and the membrane cathode to an external circuit will produce electrical power. Such cells may be stacked, with separators such as corrugated metal plates above each cathode to permit access of air to the cathode, and arrangements may be included to blow air through the cells or release oxygen into the cathode compartments. The electrodes of the invention may also be embodied in a cell to which power is supplied, rather than one supplying electrical power: for example, they may be embodied in a concentration cell for electrowinning oxygen, wherein the electrodes are each, for example, planar conductive membranes having an electrochemical catalyst such as platinum on the surface facing an electrolyte contained between them, which may be aqueous KOH, for example. The sides of the electrodes away from the electrolyte are exposed to differing concentrations of a cell feedstock such as oxygen, and the electrodes are connected to an external power source such as a dry cell, so that the direction of flow of electrons is towards the electrode exposed to the lower concentration of the oxygen. The source of the latter may be oxygen dissolved in water, for example, with a hydrophobic membrane electrode exposed thereto. This electrowinning cell will extract dissolved oxygen from water or extract oxygen from air and supply an oxygen-rich stream.

The invention is illustrated but not limited by the following examples.

EXAMPLE 1

This example describes preparation of a laminar membrane electrode.

A diluted dispersion is prepared by adding 18 grams (g.) of water to 12 g. of an aqueous dispersion of polytetrafluoroethylene. The aqueous dispersion of polymer employed is a dispersion of polytetrafluoroethylene ("Teflon" dispersion 852–201), which is believed to be an emulsion as described in U.S. Patent 2,613,193, containing about 5%, by weight of the total, toluene, about 2%, by weight of the total, of surfactants such as lauryl sulfate and an alkylaryl polyalkylene oxide ether, the remainder being the polymer and water, in approximately a 1:1 weight ratio. The average polymer particle size in this emulsion is reputedly about 0.2 micron.

Addition of 6 g. of Shawinigan carbon black, which is conductive acetylene black with a particle size of about 0.04 micron, is followed by stirring until the mixture forms a loose flock. This is placed on a polyethylene sheet, and covered with a second such sheet of flexible polyethylene. A cylindrical manual roller is used to roll this mixture out into a membrane of about one square foot surface area. The top sheet is lifted, and the rolled-out material is folded together into a small pile, after which the sheet is replaced and the mixture is rolled out again into a membrane. Repetition of this procedure 8 times produces a homogeneous viscoelastic dough. A 4 gram portion of this dough is formed into a square lump about 1 inch on a side.

A platinum-containing viscoelastic dough is prepared by diluting 0.4 g. of the above-described polytetrafluoroethylene dispersion with 2 g. of water, adding 2 g. of Englehard platinum black (particle size about 0.01 micron), and stirring the mixture, for 15–20 minutes, until it has agglomerated into a rubbery, viscoelastic dough which, in contrast to the initial loose paste, coheres together rather than wetting the walls of the glass vial in which it is mixed. A quarter of this dough is rolled out into a square lump, slightly less than an inch on a side, between flexible plastic sheeting, centered on the carbon lump prepared as described above, and both rolled out together, to a laminar square about 4 x 4 inches. A 60 x 60 mesh Monel metal screen current collector is placed over the platinum membrane and pressed into the surface of this with a roller.

The assembly is exposed to ambient room conditions (about 70° F., and 30–70% humidity) to dry for 12 hours. It is then heated gradually in a vacuum oven to 100° C. over a period of about 5 hours. (The vacuum applied in heating is described in this and subsequent examples is a nominal 10 torr.) It is then heated at 200° C. and at 300° C. each for 1 hour, at atmospheric pressure. The product is a strong, flexible porous structure which is hydrophobic on the side covered by the carbon membrane, and has a Pt concentration of about 10 mg./sq. cm. on the platinum membrane surface.

EXAMPLE 2

The above-described procedure for preparing a platinum-containing viscoelastic dough is repeated, and a quarter of this dough is then made into a non-laminar electrode by rolling out a membrane about 4 x 4 inches square from the well-mixed dough on a flexible non-adherent surface and rolling a platinum screen current collector into the membrane. The assembly is stored at room temperature for 12 hours, exposed to the air, in a relatively dry atmosphere (75% humidity). It is then gradually heated to 100° C. over 4 hours, under vacuum, and heated at 200° C. for one hour and at 300° C. for one hour at atmospheric pressure.

The laminar Pt-on-C membrane electrode of Example 1 and the platinum membrane prepared as stated are each mounted in frames which leave a 9 square inch surface area of the electrodes exposed, and placed with the screen-covered sides against a 15 mil thick asbestos separator wet with 5 molar KOH, in a cell assembly like that illustrated in FIGURES 3–4, providing an anolyte chamber behind the Pt-on-C membrane electrode, and a catholyte chamber behind the Pt membrane electrode, with inlet and outlet ports in each chamber. As the anolyte, 1–3 M hydrazine in 5 M KOH is pumped through the anolyte chamber, to contact the rear of the platinum membrane electrode, and tank oxygen is supplied at less than 5 p.s.i.g. to gently purge through the cathode feedstock chamber, contacting the carbon membrane side of the laminar membrane electrode. The cell is connected to an external circuit in which the current drawn is 100 milliamperes per sq. cm., and operated at an ambient temperature of 25° C. Over a period of more than 100 hours, the initial cell voltage of 0.7 volt drops to a final cell voltage of 0.6 volt.

EXAMPLE 3

The Pt-on-C laminar membrane electrode from the cell in Example 2 is removed from the cell, and heated 1 hour in a vacuum at 100° C. and 16 hours in a vacuum at 200° C. before being again mounted in a fuel cell. In this case, the anode of the cell is a 30 mil thick nickel powder plaque, plated with 0.7 milligram of platinum and 1.5 milligrams of palladium per sq. cm. The cell electrolyte, fuel and oxidant are as stated in Example 2. At a current drain of 100 milliamperes per sq. cm., the initial cell voltage is 0.7 volt, and after more than 2000 hours at this current drain, the cell continues to deliver 0.65 volt, with essentially no change in electrode catalytic activity, as measured by repetition of the polarization curves at increasing current drains.

EXAMPLE 4

The procedure of Example 1 is repeated except that platinum screen current collector is substituted for the Monel screen of Example 1 in preparing the laminar membrane electrode. A single membrane Pt electrode is prepared as described in Example 2, except that stainless steel screen current collector is substituted for the platinum screen. The single membrane electrode is used as anode, and the laminar membrane electrode as cathode, in a cell operating on fuel, oxidant and contained basic electrolyte as stated in Example 2. At a current drain rate of 100 milliamperes per sq. cm. (electrode size 9 sq. in.) the cell delivers an initial voltage of 0.66 volt. After continuous operation for more than 800 hours, the voltage is 0.6 volt.

EXAMPLE 5

The procedure of Example 1 is repeated, to prepare a laminar membrane cathode. The anode prepared for this cell is a thirty mil thick nickel powder plaque plated with 2.3 milligrams of palladium per sq. cm. Using electrolyte and fuel as described in Example 2, with oxygen as oxidant this cell delivers 0.82 volt at 100 milliamperes per sq. cm. current drain at 75° C. With air as oxidant, the cell voltage is 0.6 volt at this current drain and temperature.

EXAMPLE 6

This example illustrates preparation of laminar membrane electrodes with a mixture of organic solvents.

A 12 gram portion of the polytetrafluoroethylene dispersion described in Example 1 is mixed successively with 9 g. of 100% isopropanol and then 9 g. of benzene. The mixture is stirred together, and then added to 6 g. of the carbon black described in Example 1. The resulting mixture is stirred vigorously for several minutes and then ground in a mortar and pestle for about 5 minutes, when it has become a coherent rubbery dough. The dough is placed between polypropylene sheets and spread into a thin membrane with a roller as described in Example 1. This is folded into a lump and rolled out again, the folding and rolling-out operation being repeated 4 or 5 times, until the viscoelastic dough has become stiff. A quarter of this mixture is rolled into a membrane about 4 inches on a side and a 4 x 4 inch square of 30 x 30 mesh stainless steel current collector is rolled into the surface of the membrane. The screen-mounted carbon membrane is air-dried for about a half hour, and then a second membrane of the same carbon rubber, of about the same dimensions, is pressed into the carbon rubber-covered side, the assembly is dried by storing it open to the air at about 75% humidity and about 65° F. room temperature for an hour, heated in an oven at 80° C. for one half hour, then placed in an oven at 150° C. under vacuum for one hour, and finally heated in an oven at atmospheric pressure at about 300° C. for one hour. The completed carbon cathode assembly is 20 mils thick.

To prepare a laminar platinum anode, for use as the anode in a cell with the above-described cathode, a platinum-containing dough is produced by adding 2 g. of water to 0.4 g. of the polytetrafluoroethylene dispersion in Example 1, and mixing 2 g. of Engelhard platinum black into the diluted dispersion. The resulting mixture is stirred until it agglomerates into a coherent dough, thoroughly homogenized by application of shearing force, and finally rolled out into a thin membrane. A square of 80 x 80 mesh stainless steel current collector, about 4 inches on a side, is pressed into this membrane. The platinum-covered side of this product is covered with a second membrane, of about the same dimensions, made by mixing 2 g. of Pt black, 0.4 g. of the aqueous polytetrafluoroethylene, 1.5 g. of water and 0.5 g. of isopropanol, to form a viscoelastic dough. The assembly is now pressed together by rolling pressure, after which it is cured by air drying at room temperature for an hour, and heating ½ hour at 80°

C., 1 hour under vacuum at 150–155° C., and 1 hour at 300° C.

EXAMPLE 7

This example illustrates utilization of electrodes prepared as described in Examples 6 in a cell.

The stated electrodes are placed with the screen-coated faces contacting a separator consisting of 5 M phosphoric acid gelled by addition of a silica gel ("Santocel" FR–C) in the amount of about 15% by weight of the total (acid plus silica gel). The electrodes and electrolyte are clamped between end plates which have inlet and outlet ports for admission of anolyte and catholyte to the anode and cathode respectively, corresponding essentially to the cell assembly illustrated in FIGURE 4. The anode is supplied with an anolyte of one molar hydrazine and 5 molar phosphoric acid, and the cathode, with a catholyte of 5 molar nitric acid in 5 molar phosphoric acid, while current is drawn from the cell by connection of the anode and cathode to an external circuit. With the cell at 45–90° C., at a current drain of 6.0 amperes, the cell delivers a steady potential of 0.35 (at 45°) to above 0.4 (at 75–90°) volts.

The cell is operated for a number of hours with the above-identified cathode and anode feeds, cycling between open circuit and current drains up to 12 amperes, and then, retaining the anolyte feed of 1 molar hydrazine and 5 molar phosphoric acid, the cathode feed is switched to $N_2O_4$ [61900] and operated with this as oxidant. The cell, at a temperature of 65–80° C., delivers 0.6 volt at a current drain rate of 6 amperes, and 0.4–0.5 volt at current drain rates as high as 14 ampheres. The cell operates for a total of 125 hours at 6 amperes current drain without significant polarization, sustaining a steady 0.6 volt output.

EXAMPLE 8

This example illustrates preparation of laminar membrane electrodes with different solvents.

Addition of 4.5 gram of isoamyl alcohol to a 6 g. portion of the polytetrafluoroethylene dispersion described in Example 1 is followed by addition of 4.5 grams of benzene. Three grams of the carbon described in Example 1 is mixed with the diluted polymer dispersion, and the procedure of mixing, grinding, and repeatedly rolling out described in the examples above is followed to produce a viscoelastic dough, half of which is rolled out into a membrane. A platinum membrane is prepared by mixing 2 g. of Engelhard platinum black, 0.4 g. of the above-described polytetrafluoroethylene aqueous dispersion, and 2 g. of water. This mixture is stirred until it agglomerates into a viscoelastic dough, which is then rolled out repeatedly to subject it to shearing stress and homogenize it. Finally a quarter of the dough is rolled out into a membrane of about the same dimensions as the carbon membrane, and this platinum membrane is placed on the carbon membrane and pressed into it, by rolling pressure applied with the membrane layers enclosed between sheets of polypropylene film. A screen current collector is laid over the platinum side of the laminate, and the assembly is pressed together, while protected by polypropylene sheets, by rolling pressure. The resulting product is cured by air-drying and heating as described in the above examples. The resulting electrodes are flexible, strong, smooth and crack-free, and they are useful as electrodes in a fuel cell.

EXAMPLE 9

This example describes utilization of electrodes prepared as described in Example 8.

A cell assembly is employed corresponding essentially to that illustrated in FIGURE 4. The separator is an asbestos sheet soaked with 5 M KOH as electrolyte. The carbon/platinum electrode prepared as described in Example 8 is employed as the cathode, with the screen side placed against the separator. For use as the anode a porous nickel plaque 25 mils thick is plated on one side with palladium black, in a concentration of about 10 mg. Pd/sq. in. This is placed with the Pd-coated side against the electrolyte-containing separator, and the electrodes and separator are clamped between end plates providing feedstock compartments on the sides of the electrodes away from the separator. The exposed electrode areas are 9 square inches, each.

Oxygen is fed to the cathode feedstock compartment, and 3 M hydrazine in 5 M KOH is supplied as the anode feedstock, while connections are made from the current collectors of the respective electrodes to an external circuit which places a current drain of 3 amperes on the cell. Under this load, the cell delivers a steady voltage of above 0.8 volt during operation for a period of 25 hours.

EXAMPLE 10

A mixture of 9 g. of isoamyl alcohol with 6 g. of the polytetrafluoroethylene dispersion described in Example 1 is added to 3 g. of the carbon described in Example 1, and the mixture is made into a homogeneous viscoelastic dough by stirring, rubbing in a mortar and pestle, and folding in and rolling out the dough repeatedly as described above. Half of this dough is spread into a membrane. A quarter of the viscoelastic dough prepared from 2 g. of Pt black, 0.2 g. of the polytetrafluoroethylene dispersion and 2 g. of water as described in Example 8 is made into a membrane which is pressed into the carbon membrane, after which a screen current collector is pressed into the laminated membranes, and the assembly is cured by heating, following the procedure described in Example 8.

The resulting platinum-on-carbon electrode is used as the cathode in a cell employing an anode, electrolyte, and anode and cathode feedstocks as described in Example 9. This cell also delivers above 0.8 volt at a 3 ampere current drain, throughout continuous operation of the cell for 3.5 hours.

EXAMPLE 11

This example illustrates preparation and testing of an electrode using larger particle size electrode material.

A mix is prepared of the following composition

| | Grams |
|---|---|
| Shawinigan carbon black as described in Example 1 | 3.84 |
| "Hitco" carbon filament, 0.35–0.45 mil diameter, about ¼ in. long (min. 94% C.) | 0.96 |
| Polytetrafluoroethylene dispersion as described in Example 1 | 14.4 |
| Anhydrous isopropanol | 9.0 |
| Anhydrous benzene | 9.0 |

This mixture is stirred, ground, and repeatedly folded together and rolled out until it forms a viscoelastic dough. Somewhat more liquid is lost from this mixture in this process than in working up a similar mixture wherein the particulate electrode material consists entirely of the fine particle size carbon black. After a viscoelastic dough has been formed, the mixture is divided into quarters, and two of these portions are each rolled out into a membrane in the shape of a square about 6 inches on a side. One of these membranes is placed on top of the other, and they are pressed together with a roller, and then a square stainless steel 60 x 60 mesh screen is rolled into the surface of the laminar membrane assembly. The resulting assembly is dried by exposure to air for about an hour, heated ½ hour at about 80° C., an hour at 150° C. under vacuum, and an hour at 300–325° C., to cure it. The resulting laminar membrane electrode is strong, flexible and hydrophobic but porous to gas.

To provide an anode for use with the cathode prepared as stated above, two viscoelastic doughs are made by combining, for each, 2 g. platinum black, 0.4 g. of the polytetrafluoroethylene dispersion described in Example 1 and 2 g. of water. A first of these doughs is rolled out into a membrane about 4 x 4 inches square, and a 60 x 60 mesh stainless steel screen square of about the same dimensions, which has previously been sprayed with a dilute dispersion of polytetrafluoroethylene made by adding 90 g. of water and 5 g. of isopropanol to the 50% polytetrafluoroethylene dispersion described in Example 1, heated at 300° C. for about 15 minutes, sprayed again with this dispersion, and again heated at 300° C. The assembly of screen and membrane is air-dried for 15 minutes, while 0.2 g. of isopropanol is mixed into the second of the platinum-containing viscoelastic doughs, and the resulting stiff dough is rolled out into a membrane. A square of stainless steel screen treated as described above is rolled into the latter membrane and the resulting assembly is combined with the first assembly of platinum-containing membrane and screen, with the two membranes placed face-to-face. The four-layer assembly of two screens and two membranes is cold-pressed at 1500 p.s.i.g. (which produces little loss of liquid), and then air-dried for an hour, heated at 80° C. for an hour, and heated at about 150° C. for one hour under vacuum. The assembly is kept under vacuum overnight, at ambient temperature, and then the cure is completed by heating at 300° C. for an hour, at atmospheric pressure.

The cathode and anode prepared as stated are placed in frames which leave a square 3 x 3 inches of the electrodes exposed, and the screen-covered sides are placed against a separator made by gelling phosphoric acid with a silica aerogel, as described in Example 7, which is spread on an electrode screen surface in the electrode frame, in a layer about 1/16 inch thick, and the other electrode and frame laid over it to contain the electrolyte. The electrodes and separator are clamped between end plates including anolyte and catholyte chambers, as illustrated in FIGURE 4, and a flow of $N_2O_4$ gas is passed through the chamber behind the carbon laminar membrane cathode, while a solution of 3 M hydrazine in 5 M $H_3PO_4$ is pumped through the anolyte chamber. The cell is heated to 90° C., and the electrodes are connected to an external circuit drawing a current of 6 amperes ($\approx$100 amperes per square foot). The cell potential is sustained at 0.35 volt for 45 minutes operation at this current drain level.

EXAMPLE 12

This example describes preparation of a battery of fuel cells incorporating laminar membrane electrodes.

Twelve laminar membrane electrodes are prepared which are oblongs 3.25 x 6 inches, and are a laminate of a carbon membrane with a platinum membrane, having a stainless steel screen pressed into the platinum membrane surface. The amounts used to make each carbon membrane are about 1/3 to 1/2 of a dough made from 6 g. of the Shawinigan carbon black described above, 12 g. of the polytetrafluoroethylene dispersion described above, 9 g. of isopropanol and 9 g. of benzene. The procedure used to make a viscoelastic dough from these ingredients is as described in Example 6, and the viscoelastic dough is rolled out into an oblong membrane about 4 by 7 inches and 15–20 mils thick. To this is applied a membrane made by rolling out about a quarter of a viscoelastic dough produced by mixing 2 g. of platinum black, 2 g. of water and 0.4 g. of polytetrafluoroethylene dispersion, as described in Example 8, producing a platinum loading of about 4.5 mg. Pt/sq. cm. After the platinum membrane has been pressed onto the carbon membrane by rolling, a screen of 60 x 60 mesh stainless steel measuring 3¼ x 6 inches is pressed into the laminate of membranes with a manual roller, and the assembly is air-dried for about an hour, and cured by heating for a half hour at about 80° C., an hour at 150–155° C. under vacuum, and an hour at 300° C. at atmospheric pressure.

To provide anodes to be used with the cathodes prepared as described above, twelve porous nickel plaques measuring about 3 x 6 inches and 25–30 mils thick are chemiplated with palladium. A cell is assembled by placing the palladium-coated side of the anode and the platinum-coated side of the cathode against an asbestos separator, and heavy corrugated stainless steel screens, about ¼ to ½ inch thick and measuring about 3 x 4 inches are centered against the outside of this assembly. The heavy screen against the cathode has gaskets placed above and below it; the heavy screen against the anode has a polyethylene-polypropylene gasket surrounding it on all four sides. The gaskets are each pierced by holes about 0.5 inch in diameter at each outside corner, and these corners protrude outside of the 3 x 6 area of the electrodes. Channels are provided from the holes in the gasket around the anode to the interior of the space surrounded by it. The 12 cells are assembled by placing a nickel plate between the screen and gasket behind the anode of one cell and the screen and gasket behind the cathode of the next cell, producing a series connection of each cell to the next. The corners of the nickel plate protrude beyond the 3 x 6 electrode area and are pierced by holes like the gaskets. Electrical connections are made to the end plates of the battery of cells for connection to an external circuit.

The battery of cells is connected to a tank containing 3 M hydrazine in 5 M KOH, placed against one end of the cell assembly and suitably electrically insulated from it, with openings from the tank to the holes extending through the gaskets and nickel plates in and between cells, with the cells placed so that when the tank is upright, this anolyte flows through the openings and up into the anode chambers in the battery. In this position, the sides of the cathodes which are not covered by gasketing are at the top and bottom of the battery, in which the cells are in the vertical plane. Blowing air down across the top of the cells accordingly supplies air to the cathodes, by passage through the chambers formed by the coarse steel mesh behind the cathodes, and this air exits from the bottom of these passages, together with reject gases such as the nitrogen in the air supply. A parasitical blower, which operates by tapping power from cells of the battery, provides the air supply, drawing from the ambient atmosphere. The anolyte rising into the anode chambers inside the gasketing surrounding the anodes tends to rise to the level of the anolyte in the tank, and is lifted by the nitrogen produced through electrochemical reaction of the hydrazine, by which means it is lifted to the level of the top holes in the gaskets and nickel plates, and flows through these passages back into the anolyte supply tank. A vent is provided for purging this nitrogen off-gas to the outside atmosphere; if desired, this can include a hydrazine decomposition catalyst such as platinized steel wool to prevent emergence of hydrazine vapors with the nitrogen exhaust. The electrochemical reaction product of the oxygen in air and the hydrogen in hydrazine is water, which exits from the cell with the anolyte.

This 12-cell module is rated at a nominal 100 watts, and delivers 200 watts at peak, at ordinary ambient temperatures. It will operate heavy equipment such as a power drill or aircraft landing lights. It is started simply, by positioning the cell and tank vertically, permitting flow of the anolyte into the battery, and blowing a puff of air into the cell chamber, to initiate production of enough current to start the parasitical air blower. It is stopped as simply, by tipping the assembly over into the horizontal position, with the tank below and the cells in a horizontal position above the tank, whereby gravity flow drains the anolyte from the cells.

Because of the unique ability of this laminar platinum-carbon cathode to operate on oxygen without being affected by the presence of hydrazine at the cathode, this battery is able to function on the combination of oxygen (as air) and hydrazine without significant deterioration over prolonged periods of time. Because the laminar membrane cathode is hydrophobic, there is no liquid flow-through from the separator and anode into the cathode chamber. Because this cathode is also conductive, it is possible to construct the cell as stated, whereby the heavy steel mesh and nickel plates in the cell assembly which connect the cells in series collect the current from the entire back face of the cathodes (the side away from the separator). If the back of this electrode were covered by a hydrophobic coating having a high resistance, it would be necessary to collect current from it only at the edges, through leads connected to the conductive part of the cathode, and this could result in raising the internal resistance of the cells, thus decreasing it power output. Accordingly, the cells and battery described in this example have many unique and advantageous properties.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A laminar membrane assembly useful as an electrode comprising conductive, porous layers of a continuous network of interconnected polymeric binder particles coated with an electrode material, one layer consisting essentially of a polymeric binder, a hydrophobic, particulate, conductive carbon electrode material in an amount sufficient to render said layer hydrophobic, and the other layer consisting essentially of a polymeric binder and a particulate, metallic, hydropholic electrode material in an amount sufficient to render said layer hydrophilic, said layers being formed by mixing said electrode materials, said polymeric and a liquid dispersing medium to form viscoelastic doughs, spreading said doughs to form membranes pressed together in a laminar assembly without substantially changing the liquid content of the viscoelastic doughs and heating the laminar membrane assembly to cure it.

2. A laminar membrane assembly of claim 1 wherein said polymeric binder is polytetrafluoroethylene.

3. A laminar membrane assembly of claim 1 wherein said assembly comprises a first layer consisting essentially of a hydrophobic, particulate, conductive carbon and polytetrafluoroethylene and a second layer consisting essentially of platinum black and polytetrafluoroethylene.

4. The method of operating a fuel cell which comprises supplying hydrazine as the fuel and an oxidant providing oxygen as the oxidant to electrodes contacting an electrolyte wherein at least one electrode is a laminar membrane electrode as defined in claim 3.

5. A laminar membrane assembly of claim 1 having a screen pressed into the surface thereof prior to curing.

6. A fuel cell wherein at least one electrode is a laminar electrode membrane as defined in claim 1.

7. The method of making a laminar membrane assembly useful as an electrode and comprising porous layers of a continuous network of interconnected polymeric binder particles coated with electrode materials which comprises the steps of:

(a) forming a hydrophobic viscoelastic dough by mixing ingredients consisting essentially of a polymeric binder and a liquid dispersing medium and a hydrophobic, particulate, conductive carbon in an amount sufficient to render said dough essentially hydrophobic;

(b) forming a hydrophilic viscoelastic dough by mixing ingredients consisting essentially of a polymeric binder and a liquid dispersing medium and a hydrophilic metallic electrode material in an amount sufficient to render said dough essentially hydrophilic;

(c) spreading said doughs to form two layers pressed together in a laminar assembly without substantially changing the liquid content of said doughs; and (d) heating the laminar assembly to cure it.

8. The method of claim 7 wherein said polymeric binder is polytetrafluoroethylene.

9. The method of claim 7 wherein said polymeric binder is initially in dispersion.

10. The method of claim 7 wherein said viscoelastic doughs are spread into membranes by rolling out the doughs.

11. The method of claim 7 wherein the viscoelastic doughs are spread into layers separately, and then pressed together without substantial changes in the liquid content of the doughs.

12. The method of claim 7 wherein the viscoelastic doughs are spread into layers and pressed together substantially simultaneously, without substantial changes in the liquid content of the doughs.

13. The method of claim 7 wherein a foraminous structure is pressed into a surface of said laminar prior to curing by heating.

14. The method of claim 7 wherein said hydrophobic electrode material is carbon, said hydrophilic electorde material is platinum and said binder is in each case polytetrafluoroethylene.

References Cited

UNITED STATES PATENTS

| | | | |
|---|---|---|---|
| 2,824,165 | 2/1958 | Marsal | 136—126 X |
| 3,158,510 | 11/1964 | Talvenheimo. | |
| 3,262,817 | 7/1966 | Thompson | 136—86 |
| 3,252,839 | 5/1966 | Langer et al. | 136—86 |
| 3,276,909 | 10/1966 | Moos | 136—86 |
| 3,281,511 | 10/1966 | Goldsmith | 136—866 X |
| 3,297,484 | 1/1967 | Niedrach | 136—86 |
| 3,318,736 | 5/1967 | Barber | 136—86 |

ALLEN B. CURTIS, Primary Examiner

U.S. Cl. X.R.

136—120, 121, 122